United States Patent
Minamikawa et al.

(10) Patent No.: US 7,148,164 B2
(45) Date of Patent: *Dec. 12, 2006

(54) LOW EXPANSION TRANSPARENT GLASS-CERAMICS, GLASS-CERAMIC SUBSTRATE AND OPTICAL WAVEGUIDE ELEMENT

(75) Inventors: Hiroyuki Minamikawa, Sagamihara (JP); Kazuo Ohara, Yokohama (JP); Naoyuki Goto, Machida (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 265 days.

This patent is subject to a terminal disclaimer.

(21) Appl. No.: 09/841,614

(22) Filed: Apr. 24, 2001

(65) Prior Publication Data

US 2002/0022564 A1     Feb. 21, 2002

(30) Foreign Application Priority Data

| Jul. 7, 2000 | (JP) | ............................. 2000-206914 |
| Sep. 8, 2000 | (JP) | ............................. 2000-273411 |
| Mar. 9, 2001 | (JP) | ............................. 2001-066304 |

(51) Int. Cl.
*C03C 10/14* (2006.01)
*C03C 10/12* (2006.01)

(52) U.S. Cl. ............................................. 501/4; 501/7
(58) Field of Classification Search ................ 501/4, 501/7; 428/846.9
See application file for complete search history.

(56) References Cited

U.S. PATENT DOCUMENTS

| 3,681,102 A | | 8/1972 | Beall ........................... 501/10 |
| 4,835,121 A | * | 5/1989 | Shibuya et al. ................ 501/4 |
| 5,017,519 A | * | 5/1991 | Morimoto et al. ............. 501/7 |
| 5,028,567 A | * | 7/1991 | Gotoh et al. .................. 501/10 |
| 5,336,643 A | * | 8/1994 | Goto et al. ..................... 501/4 |
| 5,591,682 A | * | 1/1997 | Goto ............................. 501/4 |
| 5,968,857 A | * | 10/1999 | Pickney ...................... 501/10 |
| 5,972,816 A | * | 10/1999 | Goto ............................. 501/4 |
| 6,087,280 A | * | 7/2000 | Beall et al. .................... 501/7 |
| 6,248,678 B1 | * | 6/2001 | Pickney ...................... 501/10 |

FOREIGN PATENT DOCUMENTS

| DE | 2064528 | * | 12/1970 |
| EP | 0 587 979 | | 3/1994 |
| JP | 2715138 | * | 10/1990 |
| JP | 11-100230 | * | 4/1999 |
| JP | 11-100231 | * | 4/1999 |
| JP | 2000-95559 | * | 4/2000 |
| JP | 2001-348250 | * | 12/2001 |
| SU | 695979 | * | 11/1979 |
| WO | 97 26572 | | 7/1997 |

* cited by examiner

*Primary Examiner*—Karl Group
(74) *Attorney, Agent, or Firm*—Hedman & Costigan PC; James V. Costigan

(57) ABSTRACT

There are provided low expansion transparent glass-ceramics obtained by heat treating a base glass produced at a relatively low melting temperature of 1530° C. or below. The glass-ceramics have an average linear thermal expansion coefficient within a range from $+6\times10^{-7}/°$ C. to $+35\times10^{-7}/°$ C., 80% transmittance wavelength ($T_{80}$) of 700 nm or below, internal transmittance of 75% or over at light wavelength of 1550 nm, heat resisting temperature of 800° C. or over and Young's modulus of 90 GPa or over. The glass-ceramics comprise $SiO_2$, $Al_2O_3$, MgO, CaO, BaO, ZnO, $Li_2O$, $TiO_2$ and $ZrO_2$ and contain β-quartz or β-quartz solid solution as a predominant crystal phase. There are also provided optical waveguide elements and an arrayed waveguide grating (AWG) type planar lightwave circuit utilizing these glass-ceramics.

11 Claims, No Drawings

LOW EXPANSION TRANSPARENT GLASS-CERAMICS, GLASS-CERAMIC SUBSTRATE AND OPTICAL WAVEGUIDE ELEMENT

BACKGROUND OF THE INVENTION

This invention relates to low expansion, transparent glass-ceramics, glass-ceramic substrates and optical waveguide elements comprising such low expansion, transparent glass-ceramics.

Known in the art of glass-ceramics are several types of low expansion, transparent glass-ceramics formed by melting and heat treating a base glass of a $SiO_2$—$Al_2O_3$—$Li_2O$ system containing a nucleating agent.

For example, U.S. Pat. No. 3,499,773 discloses low expansion transparent glass-ceramics selectively providing a non-transparent portion which is obtained from a base glass of a $SiO_2$—$Al_2O_3$—$Li_2O$ system containing one or more of $TiO_2$, $ZrO_2$ and $SnO_2$ as a nucleating agent and optionally a small amount of MgO, CaO, SrO, BaO etc. For manufacturing the glass-ceramics disclosed in this patent, the melting temperature was 1537° C. to 1593° C. (Example 1: 2800° F. to 2900° F.). U.S. Pat. No. 4,341,543 discloses transparent glass-ceramics obtained from a base glass of a $SiO_2$—$Al_2O_3$—$Li_2O$ system containing $TiO_2$ and $ZrO_2$ as nucleating agents. For manufacturing the glass-ceramics disclosed in this patent, the melting temperature was 1650° C.

In manufacturing these glass-ceramics disclosed in the patent specifications of the above mentioned patents, however, a relatively high temperature is required for melting the base glasses which results in difficulty in producing glass-ceramics having an excellent optical homogeneity in a large scale.

U.S. Pat. No. 3,681,102 describes that glass-ceramics of a $SiO_2$—$Al_2O_3$—ZnO system containing spinel crystal as a predominant crystal phase and having an average linear thermal expansion coefficient α within a range from $25 \times 10^{-7}$ to $40 \times 10^{-7}$ were obtained at a melting temperature within a range from 1650° C. to 1800° C. Japanese Patent Application Laid-open Publication No. Hei 11-335139 describes that glass-ceramics of a $SiO_2$—$Al_2O_3$—ZnO system containing spinel crystal as a predominant crystal phase and having an average linear thermal expansion coefficient α within a range from $33 \times 10^{-7}$ to $40 \times 10^{-7}$ were obtained at a melting temperature within a range from 1600° C. to 1625° C. These glass-ceramics, however, require a high melting temperature of 1600° C. or over and, moreover, contain gahnite ($ZnAl_2O_4$) which is known to be a very hard crystal and, therefore, have difficulty in polishing.

Japanese Patent Application Laid-open Publication Nos. Hei 10-321759 and Hei 10-321760 describe that low expansion glass-ceramics were obtained at a relatively low melting temperature. These glass-ceramics, however, are all opaque glass-ceramics and no transparent glass-ceramics were obtained.

An optical waveguide element generally consists of a lower clad, a core and an upper clad disposed on a substrate. $SiO_2$ clads made of $SiO_2$ are used for the lower and upper clads, a $SiO_2$—$GeO_2$ core made by doping $GeO_2$ is used for the core, and a Si single crystal wafer or quartz is used for the substrate (Japanese Patent Application Laid-open Publication Nos. Hei 7-113923, Hei 11-2733 and 2000-121867).

There is a recent tendency toward seeking higher physical and chemical properties for low expansion transparent glass-ceramics. These properties include:

(1) Melting and refining of a base glass should be easy and, for this purpose, materials of the base glass should not include cord, foam or inclusion but should have a high optical homogeneity.

(2) Precipitated crystal should be fine and have excellent transparency, particularly excellent transmittance in the visible rays region.

(3) Materials should not substantially contain $Na_2O$ or $K_2O$, since, if the materials contain $Na_2O$ or $K_2O$, ions of such ingredient scatter during processing of the glass resulting in difficulties.

(4) Low expansion transparent glass-ceramics generally contain a relatively large amount of $SiO_2$ for achieving required properties and hence a relatively high melting temperature of 1600° C. or over is generally required. From the standpoint of manufacturing process design and quality control, however, a lower melting temperature is preferable.

In a case where a Si single crystal wafer is used as a substrate for an arrayed waveguide grating (AWG) type planar lightwave circuit using an optical waveguide element, the surface of the substrate is exposed to a temperature exceeding 800° C. in the manufacturing process and, for this reason, deformation or distortion of the substrate takes place due to difference in thermal expansion between the substrate and layers provided on the substrate and such deformation and distortion in turn cause change in light wavelength and impairs flatness of the substrate. Even in a normal state of use, difference in a coefficient of thermal expansion between Si single crystal and $SiO_2$ produces stress in the arrayed waveguide grating resulting change in refractive index of the arrayed waveguide grating and this necessitates insertion of a wavelength sheet in the center of the arrayed waveguide grating. There is an additional disadvantage in using the Si single crystal as the substrate that adjustment of temperature becomes necessary.

On the other hand, use of quartz as the substrate is disadvantageous, as compared with the Si single crystal, in respect of heat conductivity, mechanical properties and easiness of processing.

It is, therefore, an object of the invention to eliminate the above described disadvantages of the prior art technique and dissolve the problem that glass-ceramics which may overcome such disadvantages require a high melting temperature.

It is another object of the invention to provide low expansion transparent glass-ceramics and glass-ceramic substrates which can be obtained at a relatively low melting temperature, more specifically 1530° C. or below.

It is another object of the invention to provide an optical waveguide element, more particularly an arrayed waveguide grating (AWG) type planar lightwave circuit, employing such low expansion transparent glass-ceramics which can maintain necessary properties in a hybrid integrated circuit and can be manufactured at a low cost.

SUMMARY OF THE INVENTION

Accumulated studies and experiments made by the inventors of the present invention for achieving the above described objects of the invention have resulted in the finding, which has led to the present invention, that low expansion transparent glass-ceramics and glass-ceramic substrates which have an average linear thermal expansion coefficient (α) within a range from $+10 \times 10^{-7}/°$ C. to $+35 \times 10^{-7}/°$ C. within a temperature range from 100° C. to 300° C., have an excellent optical homogeneity for the reason that materials of a base glass can be melted at a low melting temperature of 1530° C. or below, and also have improved transparency which is represented by 80% transmittance wavelength ($T_{80}$) of 700 nm or below can be obtained from a $SiO_2$—$Al_2O_3$—$Li_2O$ base glass containing $TiO_2$ and $ZrO_2$ as nucleating agents and further containing MgO, CaO, SrO, BaO or ZnO in specific amounts.

For achieving the above described objects of the invention, there are provided low expansion transparent glass-ceramics obtained by heat treating a base glass obtained at a melting temperature of 1530° C. or below, said glass-ceramics having an average linear thermal expansion coefficient ($\alpha$) within a range from $+6\times10^{-7}/°$ C. to $+35\times10^{-7}/°$ C. within a temperature range from 100° C. to 300° C. and having 80% transmittance wavelength ($T_{80}$) of 700 nm or below. range from 100° C. to 300° C. and having 80% transmittance wavelength ($T_{80}$) of 700 nm or below.

In one aspect of the invention, there are provided low expansion transparent glass-ceramics wherein an average linear thermal expansion coefficient ($\alpha$) is within a range from $+6\times10^{-7}/°$ C. to $+35\times10^{-7}/°$ C. within a temperature range from 100° C. to 300° C. and internal transmittance for a plate having thickness of 10 mm is 75% or over at light wavelength of 1550 nm.

In one aspect of the invention, the low expansion transparent glass-ceramics have a heat resisting temperature of 800° C. or over.

In another aspect of the invention, the low expansion transparent glass-ceramics have Young's modulus of 90 GPa or over.

In another aspect of the invention, the low expansion transparent glass-ceramics contain β-quartz or β-quartz solid solution as a predominant crystal phase.

In another aspect of the invention, the low expansion transparent glass-ceramics contain 1.5%–3.5% $Li_2O$ in mass % on the basis of amount of total oxides.

In another aspect of the invention, amount of eluting lithium ion in the low expansion transparent glass-ceramics is less than 0.0050 μg/cm².

In another aspect of the invention, the low expansion transparent glass-ceramics contain 3%–6% $TiO_2$ in mass % on the basis of amount of total oxides.

In another aspect of the invention, the low expansion transparent glass-ceramics contain three or more ingredients among RO ingredients (where R is Mg, Ca, Sr, Ba or Zn) in an amount of 0.5% or over in mass % on the basis of amount of total oxides for respective ingredients.

In another aspect of the invention, the low expansion transparent glass-ceramics contain ZnO in a larger amount than other RO ingredients in mass % on the basis of amount of total oxides.

In another aspect of the invention, the low expansion transparent glass-ceramics contain a total amount of R'O ingredients (where R' is Mg, Ca, Ba or Sr) of 3%–13% in mass % on the basis of amount of total oxides.

In another aspect of the invention, there are provided low expansion transparent glass-ceramics comprising in mass % on the basis of amount of total oxides:

| | |
|---|---|
| $SiO_2$ | 50–65% |
| $Al_2O_3$ | 20–30% |
| MgO | 0.5–2% |
| CaO | 0.5–2% |
| SrO | 0–10% |
| BaO | 1–5% |

-continued

| | |
|---|---|
| ZnO | 0.5–15% |
| $Li_2O$ | 1.5–3.5% |
| $TiO_2$ | 3–6% |
| $ZrO_2$ | 1–5% |
| $Nb_2O_3$ | 0–5% |
| $La_2O_3$ | 0–5% |
| $Y_2O_3$ | 0–5% |
| $As_2O_3$ and/or $Sb_2O_3$ | 0–2%. |

In another aspect of the invention, there is provided a method for manufacturing glass-ceramics comprising steps of:

melting glass materials comprising in mass % on the basis of amount of total oxides:

| | |
|---|---|
| $SiO_2$ | 50–65% |
| $Al_2O_3$ | 20–30% |
| MgO | 0.5–2% |
| CaO | 0.5–2% |
| SrO | 0–10% |
| BaO | 1–5% |
| ZnO | 0.5–15% |
| $Li_2O$ | 1.5–3.5% |
| $TiO_2$ | 3–6% |
| $ZrO_2$ | 1–5% |
| $Nb_2O_5$ | 0–5% |
| $La_2O_3$ | 0–5% |
| $Y_2O_3$ | 0–5% |
| $As_2O_3$ and/or $Sb_2O_3$ | 0–2% | at a melting temperature of 1530° C. or below;

cooling molten glass materials to provide a base glass; and heat treating the base glass to cause β-quartz crystal or β-quartz solid solution crystal to precipitate.

In another aspect of the invention, there is provided a glass-ceramic substrate consisting of the above described low expansion transparent glass-ceramics.

In another aspect of the invention, there is provided an optical waveguide element comprising the above described glass-ceramic substrate, a core and a clad provided on the glass-ceramic substrate, said clad having a smaller refractive index than said core.

In another aspect of the invention, there is provided an optical waveguide element comprising the above described glass-ceramic substrate, a $SiO_2$—$GeO_2$ core provided on the glass-ceramic substrate and a $SiO_2$ clad covering said core.

In another aspect of the invention, said clad comprises a lower clad and an upper clad and said lower clad is provided on the substrate and the core and the upper clad are provided on the lower clad.

In another aspect of the invention, said core is provided as an arrayed waveguide grating (AWG), a pair of slab waveguides and a plurality of input and output waveguides and functions as an optical multiplexing and demultiplexing circuit.

In another aspect of the invention, there is provided a method for manufacturing an optical waveguide element comprising steps of forming a core on the glass-ceramic substrate by reactive ion etching (RIE) and then forming a clad covering the core.

In another aspect of the invention, said core is a $SiO_2$—$GeO_2$ core and said clad is a $SiO_2$ clad.

In another aspect of the invention, a core film is formed on the substrate by chemical vapor deposition (CVD) and thereafter said core is formed by reactive ion etching (RIE).

In another aspect of the invention, a lower clad and a core film are formed on the substrate by chemical vapor deposition (CVD) and thereafter said core is formed by reactive ion etching (RIE).

In another aspect of the invention, $SiO_2$—$GeO_2$ glass particles are deposited on the substrate by flame hydrolysis deposition to form a $SiO_2$—$GeO_2$ core film, said core film is made transparent by heating and thereafter said core is formed in the form of a waveguide pattern by reactive ion etching (RIE) and a $SiO_2$ upper clad covering the core is formed by flame hydrolysis deposition (FHD).

In another aspect of the invention, $SiO_2$ glass particles and $SiO_2$—$GeO_2$ glass particles are deposited on the substrate by flame hydrolysis deposition to form a $SiO_2$ lower clad film and a $SiO_2$—$GeO_2$ core film, said lower clad film and said core film are made transparent by heating and thereafter said core is formed in the form of a waveguide pattern by reactive ion etching (RIE) and a $SiO_2$ upper clad covering the core is formed by flame hydrolysis deposition (FHD).

In still another aspect of the invention, there is provided an optical waveguide comprising a core made in the form of a waveguide pattern and a clad covering the core provided on a glass-ceramic substrate, glass-ceramics which constitute the substrate having an average linear thermal expansion coefficient ($\alpha$) within a range from $+6 \times 10^{-7}/°$ C. to $+35 \times 10^{-7}/°$ C. within a temperature range from $100°$ C. to $300°$ C., having 80% transmittance wavelength ($T_{80}$) of 700 nm or below, having internal transmittance of 75% or over for a plate having thickness of 10 mm at light wavelength of 1550 nm, and having Young's modulus of 90 GPa or over.

DETAILED DESCRIPTION OF THE INVENTION

Description will be made first about average linear thermal expansion coefficient within the temperature range from $100°$ C. to $300°$ C. of the low expansion transparent glass-ceramics of the present invention.

In relation to average linear thermal expansion coefficient of $SiO_2$, the average linear thermal expansion coefficient of the low expansion glass-ceramics of the present invention preferably is within a range from $+6 \times 10^{-7}/°$ C. to $+35 \times 10^{-7}/°$ C. and, more preferably, within a range from $+10 \times 10^{-7}/°$ C. to $+30 \times 10^{-7}/°$ C. In a case where a substrate made of transparent glass-ceramics is directly joined to a silicon substrate, the average linear thermal expansion coefficient of the transparent glass-ceramics preferably is in the same range as silicon, that is, the range from $+30 \times 10^{-7}/°$ C. to $+35 \times 10^{-7}/°$ C. In a case where an amorphous silicon thin film is deposited on a transparent glass-ceramic substrate by vapor deposition, the average linear thermal expansion coefficient of the transparent glass-ceramics preferably is within a range from $+15 \times 10^{-7}/°$ C. to $+25 \times 10^{-7}/°$ C. In a case where transparent glass-ceramics are used for a substrate of an arrayed waveguide grating (AWG) type planar lightwave circuit, the average linear thermal expansion coefficient of the transparent glass-ceramics preferably is within a range from $+20 \times 10^{-7}/°$ C. to $+30 \times 10^{-7}/°$ C. In cases where transparent glass-ceramics are used in the field of semi-conductors as a substitute for synthetic quartz and where the transparent glass-ceramics are used as a substrate of a polarization non-dependent AWG type planar lightwave circuit or an a thermal AWG type planar lightwave circuit, the average linear thermal expansion coefficient of the transparent glass-ceramics preferably is within a range from $+10 \times 10^{-7}/°$ C. to $+35 \times 10^{-7}/°$ C., more preferably within a range from $+10 \times 10^{-7}/°$ C. to $+25 \times 10^{-7}/°$ C., and most preferably within a range from $+10 \times 10^{-7}/°$ C. to $+20 \times 10^{-7}/°$ C.

The low expansion transparent glass-ceramics of the present invention have excellent homogeneity and transparency. The 80% transmittance wavelength ($T_{80}$) of the low expansion transparent glass-ceramics of the present invention preferably is 700 nm or below, more preferably, 610 nm or below and most preferably 580 nm or below. The 80% transmittance wavelength ($T_{80}$) herein means light wavelength on the shortest wavelength side corresponding to transmittance of 80% in the wavelength dependent measurement of transmittance in a sample which has been polished on both surfaces to thickness of 10 mm. Internal transmittance for a plate having thickness of 10 mm preferably is 84% or over at light wavelength of 500 nm and 98% or over at light wavelength of 980 nm. Particularly, since light in the vicinity of 1550 nm is used for a substrate of an optical waveguide for an arrayed waveguide grating (AWG) type planar lightwave circuit in the field of telecommunication, internal transmittance of a plate having thickness of 10 mm preferably is 75% or over. Refractive index of the glass-ceramics preferably is 1.46–1.58 and, more preferably, 1.47–1.57 at light wavelength of 1550 nm.

The low expansion transparent glass-ceramics of the present invention preferably have heat resisting temperature of $800°$ C. or over. The heat resisting temperature of $800°$ C. or over herein means that the specimen is not broken when the specimen is heated quickly in an electric furnace in which temperature is set at $800°$ C. and, after being kept at that temperature for a sufficient length of time, is dropped into water. The low expansion transparent glass-ceramics of the present invention more preferably has heat-resisting temperature of $950°$ C. The heat resisting temperature of $950°$ C. or over herein means that the specimen is not broken when the specimen is heated quickly in an electric furnace in which temperature is set at $950°$ C. and, after being kept at that temperature for sufficient length of time, is dropped into water.

The low expansion transparent glass-ceramics of the present invention preferably have Young's modulus of 90 GPa or over for enabling precision processing of the glass-ceramics.

In one aspect of the invention, the low expansion transparent glass-ceramics of the present invention contain $\beta$-quartz or $\beta$-quartz solid solution as a predominant crystal phase. "Predominant crystal phase" herein means a crystal phase which is essential for forming a preferred embodiment of the low expansion transparent glass-ceramics of the present invention and is included in a larger amount than any other crystals. $\beta$-quartz solid solution means a solid solution crystal in which $\beta$-quartz is partly mixed with or replaced by different atoms. $\beta$-quartz solid solution includes $\beta$-eucryptite ($Li_2O$—$Al_2O_3$—$2SiO_2$) and $\beta$-eucryptite solid solution in which $\beta$-eucryptite is partly mixed with or replaced by other oxide or oxides including MgO and ZnO. For maintaining the melting temperature at a low level and facilitating polishing, composition of a base glass and crystallizing conditions should be properly selected so as not to include spinel crystal, particularly gahnite.

The low expansion transparent glass-ceramics of the present invention preferably contain $SiO_2$, $Al_2O_3$, MgO, CaO, BaO, ZnO, $Li_2O$, TiO, and $ZrO_2$. A preferable composition range of the glass-ceramics of the present invention will now be described. Amount of each ingredient is expressed in mass % on the basis of amount of total oxides.

The $SiO_2$ ingredient is a very important ingredient which forms β-quartz or β-quartz solid solution as a predominant crystal phase by heat treating a base glass. This ingredient preferably is contained in an amount of 50% or over for preventing crystal grains from becoming coarse and securing excellent transparency. This ingredient preferably is contained in an amount not exceeding 65% for achieving excellent melting and refining properties of the base glass at a relatively low temperature and maintaining optical homogeneity of the glass-ceramics.

The $Al_2O_3$ ingredient is a very important ingredient in that it is a component of β-quartz solid solution and serves to lower the melting temperature by adding this ingredient in a relatively large amount. For sufficiently lowering the melting temperature and achieving glass-ceramics which are homogeneous and free from opaqueness, 20% or more of this ingredient should preferably be included and the amount of this ingredient should preferably not exceed 30% for preventing deterioration in the melting property and resistance to devitrification.

In the glass-ceramics of the present invention, the amount and the composition ratio of RO (where R is Mg, Ca, Ba, Sr or Zn) ingredient are important in that this ingredient significantly improves melting property of the base glass and optical homogeneity of the glass-ceramics without impairing transparency. For securing these effects, total amount of the RO ingredients preferably is 3.5% or over, more preferably 6% or over and, most preferably, 7% or over. The total amount of the RO ingredients preferably is 25% or below, more preferably 20% or below and, most preferably, 15% or below.

The ZnO ingredient is the most important ingredient of the RO ingredients. It is therefore preferable that the ZnO ingredient should be contained in a larger amount than the other RO ingredients. For realizing the above described effects of the RO ingredients, the amount of the ZnO ingredient preferably is 0.5% or over, more preferably 2% or over and, most preferably, 3% or over. However, for preventing deterioration in the melting property and resistance to devitrification of the base glass and facilitating maintaining of optical homogeneity of the glass-ceramics, the amount of the ZnO ingredient preferably is 15% or below, more preferably 13% or below and, most preferably, 11% or below.

In the glass-ceramics of the present invention, it is preferable to contain plural RO ingredients for lowering the melting temperature of the base glass. It is therefore preferable to contain three or more different RO ingredients and, more preferably, four or more different RO ingredients in an amount of 0.5% or over for each ingredient.

For lowering the melting temperature of the base glass, it is preferable for the glass-ceramic of the present invention to contain R'O ingredients (where R' is Mg, Ca, Ba or Sr) in a total amount of 3% or over. It is also preferable to contain R" ingredients (where R"O is Mg, Ca or Ba) in a total amount of 3% or over.

For achieving the above described effects sufficiently, an amount of the MgO ingredient preferably is 0.5% or over and, for preventing deterioration in transparency of the glass-ceramics, preferably is 2% or below. For achieving the above described effects sufficiently, an amount of the CaO ingredient preferably is 0.5% or over and, for preventing deterioration in transparency of the glass-ceramics, preferably is 2% or below. The SrO ingredient may be added in an amount not exceeding 10%. For achieving the above described effects sufficiently, an amount of the BaO ingredient preferably is 1% or over and, for preventing deterioration in the melting property and resistance to devitrification of the base glass and facilitating maintaining of optical homogeneity of the glass-ceramics, preferably is 5% or below.

For preventing deterioration in the melting property and resistance to devitrification of the base glass and facilitating maintaining of optical homogeneity of the glass-ceramics, a total amount of the R'O ingredients preferably is 3–13%, and more preferably 3–5% or 6–13%. The amount of the ZnO ingredient preferably is 0.5–15% and more preferably 0.5–5% or 6–10%. The ratio of the total amount of the R'O ingredients to the amount of the ZnO ingredient preferably is 0.3–2.0 and more preferably 0.30–0.67 or 0.8–2.0.

The $Li_2O$ ingredient is an important ingredient which, with $SiO_2$ and $Al_2O_3$, constitutes β-quartz solid solution. For preventing deterioration in the melting property of the base glass and facilitating maintaining of optical homogeneity of the glass-ceramics or facilitating precipitation of a required amount of fine crystals, the amount of the $Li_2O$ ingredient preferably is 1.5% or over. For preventing crystal grains from becoming coarse and improving transparency of the glass-ceramics, the amount of the $Li_2O$ ingredient preferably is 3.5% or below and more preferably less than 3.5%. For avoiding troubles caused by elution of alkali ions, the amount of the $Li_2O$ ingredient preferably is 3.0% or below and more preferably less than 3.0% and most preferably 2.7% or below. The amount of eluting lithium ions preferably is less than 0.0050 μg/cm$^2$, more preferably less than 0.0045 μg/cm$^2$ and most preferably less than 0.0040 μg/cm$^2$.

The $TiO_2$ ingredient is an important ingredient which adjusts the thermal expansion coefficient and also functions as a nucleating agent. For achieving required thermal expansion coefficient, the amount of the $TiO_2$ ingredient preferably is 3% or over and more preferably 3.5% or over. For preventing deterioration in resistance to devitrification of the base glass and facilitating maintaining of optical homogeneity and improving transparency of the glass-ceramics, the amount of the $TiO_2$ ingredient preferably is 6% or below.

The $ZrO_2$ ingredient functions as a nucleating agent. For precipitating a desired crystal, the amount of the $ZrO_2$ ingredient preferably is 1% or over. For preventing deterioration in resistance to devitrification of the base glass and easily maintaining optical homogeneity and improving transparency of the glass-ceramics, the amount of the $ZrO_2$ ingredient preferably is 5% or below.

The $Nb_2O_5$, $La_2O_3$ and $Y_2O_3$ ingredients are ingredients which, by introducing into the glass-ceramics with the RO ingredients, have been found to improve the melting property of the base glass and significantly improve transparency and optical homogeneity of the glass-ceramics. Addition of an excessive amount of these ingredients, however, deteriorates the melting property of the base glass and impairs homogeneity of the glass-ceramics. The amount of each of these ingredients therefore preferably is 5% or below and more preferably 3% or below. The total amount of the $Nb_2O_5$, $La_2O_3$ and $Y_2O_3$ ingredients preferably is 5% or below and more preferably 3% or below.

For obtaining homogeneous glass-ceramics, the $As_2O_3$ and/or $Sb_2O_3$ ingredient may be added as a refining agent in melting glass materials. A total amount of these ingredients up to 2% will suffice.

Other ingredients may be added within a range not impairing desired properties of the glass-ceramics of the present invention. For example, one or more of $B_2O_3$, $GeO_2$, $F_2$, $Gd_2O_3$ and $SnO_2$ may be added up to total amount of 5%.

As to $P_2O_5$, it is preferable not to add this oxide for producing the low expansion transparent glass-ceramics with the desired quality in a stable manner.

The low expansion transparent glass-ceramics of the present invention preferably do not contain alkali ingredients other than $Li_2O$. It is particularly preferable not to substantially contain $Na_2O$ or $K_2O$. Particularly in manufacturing a planar lightwave circuit such as an arrayed waveguide grating (AWG) type planar lightwave circuit developed in recent telecommunication technology, utilization of semi-conductor equipment is necessary and scattering of alkali ions poses a serious problem.

The low expansion transparent glass-ceramics of the present invention can be manufactured by melting glass materials comprising in mass % on the basis of amount of total oxides:

| | |
|---|---|
| $SiO_2$ | 50–65% |
| $Al_2O_3$ | 20–30% |
| MgO | 0.5–2% |
| CaO | 0.5–2% |
| SrO | 0–10% |
| BaO | 1–5% |
| ZnO | 0.5–15% |
| $Li_2O$ | 1.5–3.5% |
| $TiO_2$ | 3–6% |
| $ZrO_2$ | 1–5% |
| $Nb_2O_3$ | 0–5% |
| $La_2O_3$ | 0–5% |
| $Y_2O_3$ | 0–5% |
| $As_2O_3$ and/or $Sb_2O_3$ | 0–2% | at a melting temperature of 1530° C. or below, cooling molten glass materials to provide a base glass, and heat treating the base glass to cause fine β-quartz crystal or β-quartz solid solution crystal to precipitate in the glass matrix. The crystal grain diameter may be set within a range from 0.001 μm to 0.1 μm. For achieving excellent transparency and easiness in polishing, the crystal grain diameter preferably is 0.001 μm–0.1 μm and more preferably 0.001 μm–0.01 μm. By properly adjusting composition of the base glass and conditions for crystallization, glass-ceramics in which fine crystals are scattered in glass matrix and which has desired thermal expansion characteristic in addition to properties suitable for a substrate of a planar lightwave circuit such as high optical homogeneity, transparency, heat resisting property, mechanical strength, easiness in polishing and etching can be produced.

In heat treating the base glass to cause β-quartz or β-quartz solid solution to precipitate, it is preferable to heat treat the base glass in two stages, i.e., heat treat the base glass at 680° C.–730° C. for 2 to 10 hours for nucleation and thereafter heat treat the base glass further at 740° C.–790° C. for 2 to 10 hours for crystallization.

The low expansion transparent glass-ceramics of the present invention can be used as substrates for optical waveguide elements such as an arrayed waveguide grating (AWG) type planar lightwave circuit. For example, the glass-ceramics can be formed to a wafer having a diameter of about 25.4 mm–254 mm and thickness of about 0.5 mm–2.0 mm and polished easily to desired surface roughness and flatness.

The optical waveguide element of the present invention can be produced by providing a core on a substrate consisting of the above described low expansion transparent glass-ceramics and covering the core with a clad which has a smaller refractive index than the core. In a case where refractive index of the glass-ceramic substrate is smaller than that of the clad, the core and clad may be provided directly on the glass-ceramic substrate.

In a case where refractive index of the glass-ceramic substrate is larger than that of the clad, a lower clad may be provided on the glass-ceramic substrate and the core and an upper clad may be provided on the lower clad. Since the low expansion transparent glass-ceramic substrate of the present invention has low expansion characteristic and transparency in this case also, thickness of the lower clad can be made smaller compared with a case where a substrate is made of Si single crystal and, therefore, processing is facilitated and the manufacturing cost thereby can be saved.

In the optical waveguide element of the present invention, a $SiO_2$ clad which is made mainly of $SiO_2$ glass may be used as the clad and a $SiO_2$—$GeO_2$ core which is made by doping $GeO_2$ may be used as the core. Refractive index of the $SiO_2$ clad may be set at about 1.47–1.48 and refractive index of the $SiO_2$—$GeO_2$ core may be set at about 1.47–1.49 by adjusting amount of doping of $GeO_2$.

The optical waveguide element of the present invention therefore may be made by providing the $SiO_2$—$GeO_2$ core on the substrate made of the low expansion transparent glass-ceramics and covering the core with the $SiO_2$ clad having a smaller refractive index than that of the core. The optical waveguide element of the present invention may also comprise a $SiO_2$ lower clad, a $SiO_2$—$GeO_2$ core and an upper $SiO_2$ clad respectively provided on the substrate made of the low expansion transparent glass-ceramics.

An arrayed waveguide grating (AWG) type planar lightwave circuit may be made by providing an array waveguide grating, a pair of slab waveguides and a plurality of input and output waveguides on the substrate made of the low expansion transparent glass-ceramics. These waveguides can be formed to a desired pattern by the above described $SiO_2$—$GeO_2$ core. For eliminating polarization dependent loss caused by birefringence of the waveguide, a ½ wavelength sheet may be provided in the center of the arrayed waveguide grating. The ½ wavelength sheet may be made, e.g., of polyimide. By properly setting the average linear thermal expansion coefficient of the low expansion transparent glass-ceramics of the present invention within the above described range and thereby eliminating difference in thermal expansion coefficient between the clad and between the core, a polarization non-dependent AWG type planar lightwave circuit in which the ½ wavelength sheet is omitted may be designed. By omitting the process of inserting the wavelength sheet, the costs of manufacture and parts may be saved. Further, since the glass-ceramic substrate of the present invention has a smaller average linear thermal expansion coefficient than the Si single crystal substrate, it can be conveniently applied to an athermal AWG type planar lightwave circuit which can be used without adjustment of temperature.

In the optical waveguide element which is made by hybrid integration of a device on a substrate, the substrate plays the role of a heat sink and, therefore, the substrate should preferably have relatively high heat conductivity k, diffusivity of heat a and specific heat Cp. For this purpose, in the glass-ceramic substrate of the present invention, heat conductivity k preferably is 0.7 W/m·k or over and more preferably 1.2 W/m·k or over, diffusivity of heat a preferably is 0.004 $cm^2$/sec or over and more preferably 0.005 $cm^2$/sec or over, and specific heat Cp preferably is 0.6 kJ/kg·k or over and more preferably 0.7 kJ/kg·k.

The core as a desired waveguide pattern can be made by forming a core film by chemical vapor deposition (CVD) or flame hydrolysis deposition (FHD) and forming it to the core by reactive ion etching (RIE). The clad can be formed by employing film forming methods including chemical vapor deposition (CVD) or flame hydrolysis deposition (FHD). As the CVD method, atmospheric pressure CVD (APCVD) using TEOS ozone, CVD using plasma and low pressure CVD may be used.

As a method for manufacturing the optical waveguide element of the present invention, $SiO_2$ glass particles and $SiO_2$—$GeO_2$ glass particles may be deposited on the substrate of the low expansion glass-ceramics by flame hydrolysis deposition (FHD) to form a $SiO_2$ lower clad film and a $SiO_2$—$GeO_2$ core film, the lower clad film and the core film may be made transparent by heating and thereafter the core may be formed in the form of a desired waveguide pattern by reactive ion etching (RIE) and a $SiO_2$ upper clad covering the core may be formed by flame hydrolysis deposition (FHD).

The optical waveguide element of the present invention may also be made by depositing $SiO_2$—$GeO_2$ glass particles on the substrate of the low expansion transparent glass-ceramics by flame hydrolysis deposition (FHD) to form a $SiO_2$—$GeO_2$ core film, and making the glass film transparent by heating. Then, a core may be made in the form of a desired waveguide pattern by reactive ion etching (RIE) and a $SiO_2$ upper clad covering the core may be made by flame hydrolysis deposition (FHD).

EXAMPLES

Examples of the low expansion transparent glass-ceramics and glass-ceramic substrates of the present invention will now be described in comparison with some comparative examples.

Tables 1 to 5 show compositions, melting temperature of base glass, conditions of crystallization, average linear thermal expansion coefficient ($\alpha$), 80% transmittance wavelength ($T_{80}$), internal transmittance, heat resisting property, melting property of base glass and amount of eluting lithium ions of the low expansion transparent glass-ceramics and glass-ceramic substrates of the present invention as well as glass-ceramics and glass-ceramic substrates of the comparative examples. The average linear thermal expansion coefficient was measured by the method for measuring thermal expansion of optical glass according to Japan Optical Glass Industry Standard (JOGIS 08-1975).

In the examples and comparative examples, glass materials were melted at a predetermined melting temperature, the base glass after cooling was heated again for nucleation (condition: 700° C.×5h) and then for crystallization (condition: 750° C.×5h) to provide glass-ceramics of Example Nos. 1 to 12 and Comparative Example Nos. 1 to 4. By changing conditions for nucleation and crystallization (heating time was 5 hours respectively), glass-ceramics of Example Nos. 13 to 18 were provided. In the glass-ceramics of Example Nos. 1 to 20 and Comparative Example Nos. 1 and 2, β-quartz solid solution was observed as a predominant crystal phase. In the glass-ceramics of Comparative Example Nos. 3 and 4, gahnite ($ZnAl_2O_4$) was observed as a predominant crystal phase.

Judgement of the melting property was made by observing melting temperature and time, viscosity and defoaming and refining states with naked eye and considering the results of the observation comprehensively. Ranking was made in three stages of "good" which is represented by the mark ○, "passable" which is represented by the mark Δ and "not good" which is represented by the mark ×.

The heat resisting property was measured by quickly heating a substrate specimen (diameter 65 mm, thickness 0.625 mm) which has been polished on both surfaces in electric furnaces in which the temperature is set at 800° C. and 950° C. respectively, keeping the temperature for two hours and then dropping the substrate specimen into water. The specimen which was not broken under either condition is shown by the mark ○, the specimen which was broken at 950° C. is shown by the mark Δ and the specimen which was broken at 800° C. is shown by the mark ×.

The amount of eluting lithium ions was calculated by packing ultra pure water 80 ml (room temperature) and a disk (diameter 65 mm, thickness 0.625 mm) in a film pack, maintaining the contents at about 30° C. for three hours and measuring eluting lithium ions by ion chromatography.

Table 5 shows physical properties of the transparent glass-ceramics of Example Nos. 5, 12 and 2.

TABLE 1

| Composition in mass % | Examples | | | | | |
|---|---|---|---|---|---|---|
| | 1 | 2 | 3 | 4 | 5 | 6 |
| $SiO_2$ | 51.7 | 52.0 | 51.2 | 54.0 | 54.2 | 51.2 |
| $Al_2O_3$ | 25.6 | 25.5 | 27.5 | 25.7 | 25.5 | 27.5 |
| MgO | 1.0 | 1.0 | 1.0 | 1.0 | 1.0 | 0.5 |
| SrO | | | | | | |
| BaO | 1.0 | 1.0 | 1.0 | 1.0 | 1.0 | 1.0 |
| CaO | 1.3 | 1.0 | 1.5 | 1.0 | 1.3 | 2.0 |
| ZnO | 10.7 | 10.5 | 8.5 | 8.5 | 7.7 | 8.5 |
| $Li_2O$ | 2.2 | 2.5 | 2.7 | 2.5 | 2.7 | 2.7 |
| $TiO_2$ | 4.0 | 4.0 | 4.1 | 4.0 | 4.1 | 4.1 |
| $ZrO_2$ | 2.0 | 2.0 | 2.0 | 1.8 | 2.0 | 2.0 |
| $La_2O_3$ | | | | | | |
| $Y_2O_3$ | | | | | | |
| $As_2O_3$ | 0.5 | 0.5 | 0.5 | 0.5 | 0.5 | 0.5 |
| Melting temperature (° C.) | 1500 | 1500 | 1500 | 1520 | 1500 | 1500 |
| Nucleating temperature (° C.) | 700 | 700 | 700 | 700 | 700 | 700 |
| Crystallization temperature (° C.) | 750 | 750 | 750 | 750 | 750 | 750 |
| Average linear thermal Expansion coefficient ($10^{-7}$/° C.) (100° C.–300° C.) | 30 | 22 | 19 | 28 | 17 | 17 |

TABLE 1-continued

| Composition | Examples | | | | | |
|---|---|---|---|---|---|---|
| in mass % | 1 | 2 | 3 | 4 | 5 | 6 |
| 80% transmittance wavelength (nm) | 440 | 505 | 500 | 460 | 480 | 510 |
| Internal transmittance (1550 nm) (%) | 99.8 | 99.9 | 99.9 | 99.9 | 99.9 | 99.9 |
| Heat resisting property | ○ | ○ | ○ | ○ | ○ | ○ |
| Melting property | ○ | ○ | ○ | ○ | ○ | ○ |
| Amount of eluting lithium ions (μg/Disk) | 0.21 | 0.23 | 0.26 | 0.22 | 0.25 | 0.26 |
| Amount of eluting lithium ions (μg/cm$^2$) | 0.0031 | 0.0034 | 0.0038 | 0.0033 | 0.0037 | 0.0038 |

TABLE 2

| Composition | Examples | | | | | |
|---|---|---|---|---|---|---|
| in mass % | 7 | 8 | 9 | 10 | 11 | 12 |
| SiO$_2$ | 53.4 | 54.0 | 54.5 | 54.5 | 54.0 | 54.5 |
| Al$_2$O$_3$ | 25.6 | 24.0 | 24.0 | 24.0 | 23.5 | 24.0 |
| MgO | 1.0 | 1.0 | 1.0 | 1.0 | 0.5 | 1.0 |
| SrO |  |  | 2.0 | 1.5 | 2.0 | 2.2 |
| BaO | 1.0 | 1.0 | 2.0 | 1.5 | 2.0 | 2.0 |
| CaO | 1.3 | 1.3 | 1.0 | 1.0 | 1.5 | 1.0 |
| ZnO | 6.7 | 6.5 | 4.0 | 5.0 | 4.5 | 3.8 |
| Li$_2$O | 2.5 | 2.7 | 2.5 | 2.5 | 2.7 | 2.5 |
| TiO$_2$ | 4.0 | 4.0 | 4.0 | 4.0 | 3.8 | 4.0 |
| ZrO$_2$ | 2.0 | 2.0 | 2.0 | 2.0 | 1.5 | 2.0 |
| La$_2$O$_3$ |  |  | 2.0 |  | 3.0 | 2.0 |
| Y$_2$O$_3$ |  |  |  | 2.0 |  |  |
| Nb$_2$O$_5$ | 2.0 | 2.0 |  |  |  |  |
| As$_2$O$_3$ | 0.5 | 0.5 | 1.0 | 1.0 | 1.0 | 1.0 |
| Melting temperature (° C.) | 1510 | 1520 | 1520 | 1520 | 1500 | 1520 |
| Nucleating temperature (° C.) | 700 | 700 | 700 | 700 | 700 | 700 |
| Crystallization temperature (° C.) | 750 | 750 | 750 | 750 | 750 | 750 |
| Average linear thermal Expansion coefficient (10$^{-7}$/° C.) (100° C.–300° C.) | 24 | 19 | 19 | 20 | 22 | 20 |
| 80% transmittance wavelength (nm) | 535 | 540 | 580 | 570 | 555 | 585 |
| Internal transmittance (1550 nm) (%) | 99.9 | 99.9 | 99.9 | 99.9 | 99.9 | 99.7 |
| Heat resisting property | ○ | ○ | ○ | ○ | ○ | ○ |
| Melting property | ○ | ○ | ○ | ○ | ○ | ○ |
| Amount of eluting lithium ions (μg/Disk) | 0.24 | 0.25 | 0.23 | 0.22 | 0.24 | 0.23 |
| Amount of eluting lithium ions (μg/cm$^2$) | 0.0035 | 0.0037 | 0.0034 | 0.0033 | 0.0035 | 0.0034 |

TABLE 3

| Composition | Examples | | | | | |
|---|---|---|---|---|---|---|
| in mass % | 13 | 14 | 15 | 16 | 17 | 18 |
| SiO$_2$ | 51.7 | 52.0 | 51.2 | 54.2 | 54.0 | 54.5 |
| Al$_2$O$_3$ | 25.6 | 25.5 | 27.5 | 25.5 | 24.0 | 24.0 |
| MgO | 1.0 | 1.0 | 1.0 | 1.0 | 1.0 | 1.0 |
| SrO |  |  |  |  |  | 2.2 |
| BaO | 1.0 | 1.0 | 1.0 | 1.0 | 1.0 | 2.0 |
| CaO | 1.3 | 1.0 | 1.5 | 1.3 | 1.3 | 1.0 |
| ZnO | 10.7 | 10.5 | 8.5 | 7.7 | 6.5 | 3.8 |
| Li$_2$O | 2.2 | 2.5 | 2.7 | 2.7 | 2.7 | 2.5 |
| TiO$_2$ | 4.0 | 4.0 | 4.1 | 4.1 | 4.0 | 4.0 |
| ZrO$_2$ | 2.0 | 2.0 | 2.0 | 2.0 | 2.0 | 2.0 |
| La$_2$O$_3$ |  |  |  |  |  | 2.0 |
| Y$_2$O$_3$ |  |  |  |  |  |  |
| Nb$_2$O$_5$ |  |  |  |  | 2.0 |  |
| As$_2$O$_3$ | 0.5 | 0.5 | 0.5 | 0.5 | 0.5 | 1.0 |

TABLE 3-continued

| Composition | Examples | | | | | |
|---|---|---|---|---|---|---|
| in mass % | 13 | 14 | 15 | 16 | 17 | 18 |
| Melting temperature (° C.) | 1500 | 1500 | 1500 | 1500 | 1520 | 1520 |
| Nucleating temperature (° C.) | 720 | 715 | 720 | 710 | 715 | 720 |
| Crystallization temperature (° C.) | 770 | 760 | 760 | 760 | 765 | 770 |
| Average linear thermal Expansion coefficient ($10^{-7}$/° C.) (100° C.–300° C.) | 25 | 19 | 16 | 15 | 15 | 17 |
| 80% transmittance wavelength (nm) | 460 | 540 | 535 | 510 | 510 | 530 |
| Internal transmittance (1550 nm) (%) | 99.7 | 99.9 | 99.8 | 99.8 | 99.7 | 99.8 |
| Heat resisting property | ○ | ○ | ○ | ○ | ○ | ○ |
| Melting property | ○ | ○ | ○ | ○ | ○ | ○ |
| Amount of eluting lithium ions (μg/Disk) | 0.20 | 0.21 | 0.26 | 0.25 | 0.24 | 0.22 |
| Amount of eluting lithium ions (μg/cm$^2$) | 0.0030 | 0.0031 | 0.0038 | 0.0037 | 0.0035 | 0.0033 |

TABLE 4

| Composition | Examples | |
|---|---|---|
| in mass % | 19 | 20 |
| SiO$_2$ | 54.6 | 54.6 |
| Al$_2$O$_3$ | 24.0 | 24.0 |
| MgO | 1.0 | 1.0 |
| SrO | 2.0 | 2.0 |
| BaO | 2.0 | 2.0 |
| CaO | 1.0 | 1.0 |
| ZnO | 3.8 | 3.8 |
| Li$_2$O | 2.5 | 2.5 |
| TiO$_2$ | 4.0 | 4.0 |
| ZrO$_2$ | 2.0 | 2.0 |
| La$_2$O$_3$ | 2.0 | 2.0 |
| Y$_2$O$_3$ | | |
| As$_2$O$_3$ | 1.0 | 1.0 |
| Melting temperature (° C.) | 1520 | 1520 |
| Nucleating temperature (° C.) | 700 | 700 |
| Crystallization temperature (° C.) | 850 | 900 |
| Average linear thermal Expansion coefficient ($10^{-7}$/° C.) (100° C.–300° C.) | 18 | 17 |
| 80% transmittance wavelength (nm) | 580 | 610 |
| Internal transmittance (1550 nm) (%) | 90.0 | 82.5 |
| Heat resisting property | ○ | ○ |
| Melting property | ○ | ○ |
| Amount of eluting lithium ions (μg/Disk) | 0.19 | 0.17 |
| Amount of eluting lithium ions (μg/cm$^2$) | 0.0028 | 0.0025 |

TABLE 5

| Composition | Comparative Examples | | | |
|---|---|---|---|---|
| in mass % | 1 | 2 | 3 | 4 |
| SiO$_2$ | 67.7 | 68.5 | 58.8 | 63.0 |
| Al$_2$O$_3$ | 18.9 | 18.6 | 20.4 | 17.8 |
| MgO | 1.1 | 2.2 | 5.0 | 4.2 |
| SrO | | | | |
| BaO | 0.9 | 1.2 | | |
| CaO | | | | |
| ZnO | 1.6 | | 6.8 | 5.7 |
| Li$_2$O | 3.5 | 3.0 | | |
| TiO$_2$ | 3.0 | 3.9 | 3.0 | 5.0 |
| ZrO$_2$ | 2.0 | 2.0 | 5.0 | 3.0 |
| Na$_2$O | 0.2 | | | |
| K$_2$O | 0.2 | | | |
| Nb$_2$O$_5$ | | | | |
| As$_2$O$_3$ | 0.9 | 0.6 | | 0.5 |
| Melting temperature (° C.) | 1650 | 1650 | 1600 | 1625 |
| Nucleating temperature (° C.) | 700 | 700 | 700 | 700 |
| Crystallization temperature (° C.) | 750 | 750 | 750 | 750 |
| Average linear thermal Expansion coefficient ($10^{-7}$/° C.) (100° C.–300° C.) | −0.9 | −0.9 | 37.1 | 33.7 |
| Internal transmittance (1550 nm) (%) | 97.0 | 97.3 | 97.5 | 98.0 |
| Heat resisting property | X | X | X | X |
| Melting property | X | X | X | X |
| Amount of eluting lithium ions (μg/Disk) | 0.39 | 0.34 | 0.00 | 0.00 |
| Amount of eluting lithium ions (μg/cm$^2$) | 0.0057 | 0.0050 | 0.0000 | 0.0000 |

TABLE 6

| Assessed property | | Examples | | |
|---|---|---|---|---|
| | | 5 | 12 | 2 |
| Thermal properties | | | | |
| Thermal expansion coefficient ($10^{-7}/°$ C.) (30–500° C.) | | 17 | 20 | 22 |
| Transition point (° C.) | | 710 | 761 | 700 |
| Yield point (° C.) | | 826 | 834 | 820 |
| Heat conductivity k (W/m · k) | | 1.3 | 1.3 | 1.3 |
| Thermal diffusivity a ($cm^2$/sec) | | 0.006 | 0.006 | 0.006 |
| Specific heat Cp (kJ/kg · k) | | 0.7 | 0.7 | 0.7 |
| Mechanical properties | | | | |
| Specific gravity | | 2.80 | 2.71 | 2.82 |
| Young's modulus (GPa) | | 97.6 | 96.2 | 99.0 |
| Coefficient of rigidity (GPa) | | 38.0 | 38.6 | 35.1 |
| Poisson's ratio | | 0.265 | 0.247 | 0.270 |
| Knoop hardness Hk | | 680 | 620 | 720 |
| Vickers hardness Hv | | 730 | 660 | 780 |
| Abrasion rate | | 55 | 51 | 48 |
| Optical properties | | | | |
| Refractive index | 588 nm | 1.58 | 1.57 | 1.58 |
| | 1550 nm | 1.56 | 1.55 | 1.56 |
| Abbe's number ν d | | 51.2 | 50.6 | 51.5 |
| Internal transmittance(%) | 500 nm | 84 | 83 | 85 |
| (thickness: 10 mm) | 980 nm | 98 | 97 | 99 |
| | 1550 nm | 99.9 | 99.7 | 99.9 |
| Chemical properties | | | | |
| Waterproof property (powder method) | | 0.03 | 0.00 | 0.02 |
| Acid-proof property (powder method) | | 0.04 | 0.04 | 0.05 |
| Alkali-proof property (powder method) | | 0.09 | 0.10 | 0.12 |
| Electric properties | | | | |
| Dielectric loss tangent ($\times 10^{-3}$) | 25° C. | 2.5 | 2.1 | 3.0 |
| | 200° C. | 1.5 | 0.9 | 2.2 |
| Dielectric constant (1 MHz) | 25° C. | 8.8 | 9.6 | 9.7 |
| | 200° C. | 28.0 | 31.0 | 32.5 |
| Volume resistance (Ω · cm) | 25° C. | $6.2 \times 10^{13}$ | $3.8 \times 10^{13}$ | $3.5 \times 10^{13}$ |
| | 200° C. | $8.1 \times 10^{8}$ | $4.8 \times 10^{8}$ | $4.0 \times 10^{8}$ |

By subjecting the base glasses of the above described examples of the invention to the heat treatment for nucleation under a temperature within a range from 680° C. to 730° C. for 2 to 10 hours and thereafter to the heat treatment for crystallization under a temperature within a range from 740° C. to 950° C. for 2 to 10 hours, various glass-ceramics having average linear thermal expansion coefficient (α) within a range from $6 \times 10^{-7}/°$ C. to $35 \times 10^{-7}/°$ C. can be obtained. As a result of X-ray diffraction, the glass-ceramics of these examples and the Comparative Example Nos. 1 and 2 have been found to contain β-quartz solid solution as a predominant crystal phase. The glass-ceramics of Comparative Example Nos. 3 and 4 have been found to contain gahnite ($ZnAl_2O_4$) as a predominant crystal phase.

As described above, by introducing a specific range of amount of RO ingredients and other ingredients including $La_2O_3$ and $Y_2O_3$ in a $SiO_2$—$Al_2O_3$—$Li_2O$ system glass containing $TiO_2+ZrO_2$ as nucleating agents, the low expansion transparent glass-ceramics of the present invention have remarkably improved melting and refining properties of their base glasses, have the specific low linear thermal expansion coefficient and also excellent mechanical strength, processability, transparency and optical homogeneity. The glass-ceramics of the present invention can be used not only for optical component parts, substrates and various electronic materials but suitably for a substitute material of a dummy wafer (a wafer used for maintaining homogeneity of gas stream and temperature in a furnace in the diffusion process and low pressure CVD process in the manufacture of an integrated circuit) which is usually made of silicon or synthetic quartz. The low expansion transparent glass-ceramics of the present invention can also be used suitably for optical waveguide elements, particularly for a substrate of an AWG type planar lightwave circuit.

What is claimed is:

1. Low expansion transparent glass-ceramics obtained by heat treating a base glass produced at a melting temperature of 1530° or below, said glass-ceramics comprising RO, where R is Mg, Ca, Ba, Sr or Zn, in a total amount of 6–25 mass % on the basis of total oxides and wherein said ceramic contains 0.5–2 mass % of CaO, 3.5–6 mass % $TiO_2$ and 0.5–2 mass % MgO on the basis of the amount of total oxides, said glass-ceramics being free of $P_2O_5$, and having an average linear thermal expansion coefficient (α) within a range from $+6 \times 10^{-7}/°$ C. to $+35 \times 10^{-7}/°$ C. within a temperature range from 100° to 300° and having 80% transmittance wavelength ($T_{80}$) of 700 nm or below.

2. Low expansion transparent glass-ceramics as defined in claim 1 wherein internal transmittance for a plate having thickness of 10 mm is 75% or over at light wavelength of 1550 nm.

3. Low expansion transparent glass-ceramics as defined in claim 1 having a heat resisting temperature of 800° C. or over.

4. Low expansion transparent glass-ceramics as defined in claim 1 having Young's modulus of 90 GPa or over.

5. Low expansion transparent glass-ceramics as defined in claim 1 containing β-quartz or β-quartz solid solution as a predominant crystal phase.

6. Low expansion transparent glass-ceramics as defined in claim 1 containing 1.5%–3.5% $Li_2O$ in mass % on the basis of amount of total oxides.

7. Low expansion transparent glass-ceramics as defined in claim 1 wherein amount of eluting lithium ion is less than 0.0050 μg/cm².

8. Low expansion transparent glass-ceramics as defined in claim 1 containing ZnO in a larger amount than other RO ingredients in mass % on the basis of amount of total oxides.

9. Low expansion transparent glass-ceramics as defined in claim 1 containing a total amount of R'O ingredients, where R' is Mg, Ca, Ba or Sr of 3.5%–13% in mass % on the basis of amount of total oxides.

10. Low expansion transparent glass-ceramics as defined in claim 1 comprising in mass % on the basis of amount of total oxides:

| | |
|---|---|
| SiO9 | 50–65% |
| $Al_2O_3$ | 20–30% |
| MgO | 0.5–2% |
| CaO | 0.5–2% |
| SrO | 0–10% |
| BaO | 1–5% |
| ZnO | 0.5–15% |
| $Li_2O$ | 1.5–3.5% |
| $TiO_2$ | 3–6% |
| $ZrO_2$ | 1–5% |
| $Nb_2O_3$ | 0–5% |
| $La_2O3$ | 0–5% |
| $Y_2O_3$ | 0–5% |
| $As_2O_3$ and/or $Sb_2O_3$ | 0–2%. |

11. Low expansion transparent glass-ceramics obtained by heat treating a base glass produced by melting oxides at a melting temperature of 1530° or below, said glass-ceramics being free of $P_2O_5$ and having an average linear thermal expansion coefficient (α) within a range from +6×10⁻⁷/° C. to +35×10⁻⁷/° C. within a temperature range from 100° to 300° and having 80% transmittance wavelength ($T_{80}$) of 700 nm or below said oxides being selected from the group comprising in mass % on the basis of the amount of total oxides:

| | |
|---|---|
| $SiO_2$ | 50–65% |
| $Al_2O_3$ | 0–30% |
| MgO | 0.5–2% |
| CaO | 0.5–2% |
| SrO | 0–10% |
| BaO | 1–5% |
| ZnO | 0.5–15% |
| $Li_2O$ | 1.5–3.5% |
| $TiO_2$ | 3–6% |
| $ZrO_2$ | 1–5% |
| $Nb_2O_5$ | 0–5% |
| $La_2O_3$ | 0–5% |
| $Y_2O_3$ | 0–5% |
| $As_2O_3$ and/or $Sb_2O_3$ | 0–2%. |

* * * * *